United States Patent
Gupta et al.

(10) Patent No.: US 10,842,178 B2
(45) Date of Patent: Nov. 24, 2020

(54) KETOGENIC NUTRITIONAL COMPOSITION AND PREPARATION METHOD THEREOF

(71) Applicant: Samit Gupta, Mumbai (IN)

(72) Inventors: Samit Gupta, Mumbai (IN); Meenal Sharma, Mumbai (IN); Sajilata Gopalakrishnan, Mumbai (IN)

(73) Assignee: Samit Gupta, Mumbai (IN)

( * ) Notice: Subject to any disclaimer, the term of this patent is extended or adjusted under 35 U.S.C. 154(b) by 0 days.

(21) Appl. No.: 15/879,548

(22) Filed: Jan. 25, 2018

(65) Prior Publication Data

US 2018/0213833 A1    Aug. 2, 2018

(30) Foreign Application Priority Data

Jan. 29, 2017 (IN) .............................. 201721003225

(51) Int. Cl.
*A23L 33/115* (2016.01)
*A23L 33/19* (2016.01)
*A23L 33/15* (2016.01)

(52) U.S. Cl.
CPC ............. *A23L 33/115* (2016.08); *A23L 33/15* (2016.08); *A23L 33/19* (2016.08); *A23V 2002/00* (2013.01); *A23V 2200/3322* (2013.01); *A23V 2250/1846* (2013.01); *A23V 2250/1944* (2013.01); *A23V 2250/54246* (2013.01); *A23V 2250/712* (2013.01); *A23V 2300/10* (2013.01)

(58) Field of Classification Search
CPC ........ A23L 33/115; A23L 33/15; A23L 33/19; A23V 2250/54246; A23V 2250/1944; A23V 2300/10; A23V 2200/3322; A23V 2002/00; A23V 2250/1846; A23V 2250/712
See application file for complete search history.

(56) References Cited

U.S. PATENT DOCUMENTS

| | | | | |
|---|---|---|---|---|
| 2004/0022922 A1* | 2/2004 | Rutenberg | ................ | A23J 7/00 426/601 |
| 2004/0105870 A1* | 6/2004 | Hsia | .................... | A61K 31/355 424/195.16 |
| 2005/0069625 A1* | 3/2005 | Chimel | .................... | A23G 1/54 426/654 |
| 2008/0089981 A1* | 4/2008 | Butler | ....................... | A23L 2/39 426/72 |
| 2013/0045915 A1* | 2/2013 | Di Pietro | ............... | A61K 45/06 514/4.9 |
| 2014/0286923 A1* | 9/2014 | Grant | ..................... | A61K 45/06 424/94.1 |
| 2015/0079225 A1* | 3/2015 | Lonnerdal | ............... | A23L 33/30 426/2 |
| 2015/0164840 A1* | 6/2015 | O'Donnell | .............. | A23L 33/12 514/1.1 |
| 2016/0175378 A1* | 6/2016 | Bistrain | ................. | A61K 35/60 514/5.6 |

FOREIGN PATENT DOCUMENTS

DE           10111159 A1 *  9/2002  ............. A23L 33/40

OTHER PUBLICATIONS

Miranda et al. ("Egg and Egg-Derived Foods: Effects on Human Health and Use as Functional Foods," Nutrients 2015, 7, 706-729 (Year: 2015).*

* cited by examiner

*Primary Examiner* — Aradhana Sasan
(74) *Attorney, Agent, or Firm* — Myers Bigel, P.A.

(57) ABSTRACT

The present disclosure relates to nutritional composition in powder form capable of being used as an adjunct to a ketogenic diet program. The disclosed ketogenic nutritional composition can produce elevated and sustained levels of ketone bodies in blood and can synergistically induce nutritional ketosis in a subject. The ketogenic nutritional composition disclosed herein can exhibit improved physical stability, solubility, homogeneity and aqueous dispersibility as compared to existing ketogenic diet supplements, and is substantially free of carbohydrates. Further the disclosed ketogenic nutritional composition can contribute to reduction in body fat mass in individuals who are trying to lose weight, and can provide long-lasting energy and improved athletic performance to individuals during strenuous exercise. In an aspect, the present disclosure provides a ketogenic nutritional composition in powder form for promoting nutritional ketosis in a subject in need thereof, wherein the composition can include a fat, protein, vitamin, and phospholipids.

13 Claims, No Drawings

KETOGENIC NUTRITIONAL COMPOSITION AND PREPARATION METHOD THEREOF

CROSS-REFERENCE TO RELATED APPLICATION

This U.S. non-provisional patent application claims priority under 35 U.S.C. § 119 to Indian Patent Application No. 201721003225, filed on Jan. 29, 2017, in the Indian Patent Office, the disclosure of which is hereby incorporated in its entirety by reference.

FIELD OF THE INVENTION

The present disclosure pertains to technical field of dietary and nutritional supplements. In particular the present disclosure pertains to a ketogenic nutritional powder which is physically stable and substantially free of carbohydrates and capable of inducing nutritional ketosis in mammals, and to a method of preparing such nutritional powder.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Ketogenic diet is a very low carbohydrate diet, which turns the body into a fat-burning machine. Ketosis, the principal behind the ketogenic diet, is a metabolic state in which some of the body's energy supply comes from ketone bodies in blood, in contrast to a state of glycolysis in which blood glucose provides most of the energy. In other words, ketosis means excess stored body fat is burned, resulting in weight loss.

The human body, when in ketosis, essentially burns fat for fuel. During ketosis, the fat stores in the body are utilized to create water-soluble ketone bodies such as beta-hydroxybutyrate and acetoacetate, and these ketone bodies are then utilized by the body as its primary energy source. The human body produces ketone bodies during nutritional or therapeutic ketosis in the range of 2-16 mmol/L. The human body enters a state of ketosis when it has no dietary source of glucose or sugar. This typically occurs during fasting, physical exercise, or pursuing a very low carbohydrate ketogenic diet. During ketosis, human body uses dietary and bodily fats as its primary energy source. As a result, once in ketosis, one can easily induce loss of body fat by reducing dietary fat intake and adjusting carbohydrate intake low enough to sustain ketosis.

Human brain is one of the most metabolically active organs in the body and requires large quantity of energy for its functions. Under normal conditions, glucose is primary fuel for human brain, and an adult brain consumes approximately 110 g of glucose a day. Human brain may utilize ketone bodies to supplement glucose in brain when sufficient amount of glucose is not available for energy.

Recent studies have shown that improvements in efficiency of cellular metabolism, managed through ketone supplementation, could have beneficial impacts on physical, cognitive health, psychological health, and a long-term impact on health with respect to common avoidable diseases such as obesity, neurodegenerative diseases and diabetes.

It has been discovered that a state of ketosis can be achieved in mammals through the use of a diet that is relatively high in fat and relatively low in carbohydrates. Further, various ketogenic diet supplements and nutritional products have been developed and made commercially available for managing obesity, for promoting weight loss, and for improving physical performance of human body. However, existing commercially available products suffer the disadvantage of limited physical stability, solubility, homogeneity and aqueous dispersibility. Further, the producers of ketonic-diet supplements and nutritional products use substantial amounts of carbohydrate-based carriers such as corn starch and maltodextrin for the formulation of such products. This approach, however, produces an end product with 30-50% carbohydrate content which is not conducive to a ketogenic diet protocol that requires virtual elimination of plasma glucose.

Accordingly, it would be highly desirable and advantageous to provide a nutritional product for inducing nutritional ketosis, which has improved physical stability, solubility, homogeneity and aqueous dispersibility. Another advantage would be to provide a ketogenic nutritional product, which is substantially free of carbohydrates. Yet another advantage would be to provide an improved process for preparing a ketogenic nutritional product in powder form with improved physical stability, solubility, homogeneity, aqueous dispersibility and zero-carbohydrates.

The present invention satisfies the existing needs, as well as others, and generally overcomes the deficiencies found in the prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all markush groups used in the appended claims.

OBJECTS OF THE INVENTION

It is an object of the present disclosure to provide a new and improved nutritional composition capable of being used as an adjunct to a ketogenic diet program.

It is another object of the present disclosure to provide a new and improved nutritional composition capable of inducing nutritional ketosis in a subject.

It is another object of the present disclosure to provide a new and improved nutritional composition in powder form capable of inducing nutritional ketosis.

It is another object of the present disclosure to provide a ketogenic nutritional composition which is physically stable as compared to existing ketogenic diet supplements.

It is another object of the present disclosure to provide a ketogenic nutritional composition which exhibits improved solubility as compared to existing ketogenic diet supplements.

It is another object of the present disclosure to provide a ketogenic nutritional composition which exhibits improved homogeneity.

It is another object of the present disclosure to provide a ketogenic nutritional composition which exhibits improved aqueous dispersibility.

It is another object of the present disclosure to provide a ketogenic nutritional composition, which is substantially free of carbohydrates.

It is another object of the present disclosure to provide a ketogenic nutritional composition which can be used as a nutritional product, an athletic performance product and a weight-loss product.

It is yet another object of the present disclosure to provide a process for preparing a ketogenic nutritional composition in powder form.

SUMMARY OF THE INVENTION

Aspects of the present disclosure relate to nutritional composition in powder form capable of being used as an adjunct to a ketogenic diet program. The disclosed ketogenic nutritional composition can produce elevated and sustained levels of ketone bodies in blood and can synergistically induce nutritional ketosis in a subject. The ketogenic nutritional composition disclosed herein can exhibit improved physical stability, solubility, homogeneity and aqueous dispersibility as compared to existing ketogenic diet supplements, and is substantially free of carbohydrates. Further, the disclosed ketogenic nutritional composition can contribute to reduction in body fat mass in individuals who are trying to lose weight, and can provide long-lasting energy and improved athletic performance to individuals during strenuous exercise.

In an aspect, the present disclosure provides a ketogenic nutritional composition in powder form for promoting nutritional ketosis in a subject in need thereof, wherein the composition can include a fat, protein, a lipophilic vitamin as an antioxidant, and phospholipids.

In an embodiment, the fat used in the nutritional composition can be selected from the group consisting of coconut oil, fractionated coconut oil, medium chain triglyceride (MCT) oil and a mixture thereof.

In another embodiment, the protein used in the nutritional composition can be a natural protein, which can preferably be selected from the group consisting of casein, whey protein, egg protein, soy protein and a mixture of milk proteins. In a preferred embodiment, the protein can be sodium caseinate.

In an embodiment, the vitamin used in the nutritional composition can be vitamin E. In a preferred embodiment, vitamin E can include α-tocopherol.

In an embodiment, the phospholipid used in the nutritional composition can be a natural phospholipid. In one preferred embodiment, the phospholipid can be soy phospholipid. In a more preferred embodiment, soy phospholipid can contain at least 50% phosphatidylcholine.

In another aspect, the present disclosure provides a method for promoting ketosis in a subject, the method can include administering an effective amount of a composition comprising fat, protein, vitamin, and phospholipid to the subject.

In another aspect, the present disclosure provides a method for producing a ketogenic nutritional powder which is substantially free of carbohydrates, the method can include the steps of: (a) mixing a fat and a protein to form a first mixture; (b) mixing an antioxidant vitamin and a phospholipid in an organic solvent to form a second mixture; (c) providing a spray drying apparatus comprising a spray nozzle comprising a three-fluid nozzle; using the 3-fluid configuration nozzle, two feed solutions are pumped individually through the two inner concentric nozzles, while the atomising air flows through the third outer nozzle. The two feed solutions come in contact at the nozzle tip; (d) supplying the first mixture to the spray nozzle through the first inlet; (e) supplying the second mixture to the spray nozzle through the second inlet; (f) supplying an atomization gas to the spray nozzle thorough the third inlet; (g) spraying the first mixture and the second mixture through the spray nozzle by means of atomization gas to produce a ketogenic nutritional powder.

In one preferred embodiment of the method of the present disclosure, the first mixture can be prepared by blending coconut oil and sodium caseinate, and homogenizing a resulting mixture into an dispersion.

In another preferred embodiment of the method of the present disclosure, α-tocopherol and soy phospholipids may be mixed and dissolved in ethanol to produce the second mixture.

In an embodiment, the first mixture and the second mixture can be sprayed through the spray pressure nozzle using an atomization nitrogen gas to form fine droplets. In the spray drying chamber, ethanol and water are evaporated from the droplets to result in a ketogenic nutritional product in the powder form.

Various objects, features, aspects and advantages of the inventive subject matter will become more apparent from the following detailed description of preferred embodiments.

DETAILED DESCRIPTION OF THE INVENTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Unless the context requires otherwise, throughout the specification which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

In some embodiments, the numbers expressing quantities of ingredients, properties such as concentration, and so forth, used to describe and claim certain embodiments of the invention are to be understood as being modified in some instances by the term "about." Accordingly, in some embodiments, the numerical parameters set forth in the written description are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The headings and abstract of the invention provided herein are for convenience only and do not interpret the scope or meaning of the embodiments.

Various terms are used herein. To the extent a term used in a claim is not defined below, it should be given the broadest definition persons in the pertinent art have given that term as reflected in printed publications and issued patents at the time of filing.

Reference will now be made in detail to the exemplary embodiments of the present disclosure, examples of which are illustrated in the accompanying drawings. Wherever possible, the same reference numbers are used in the drawings and the description to refer to the same or like parts.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The present disclosure relates to nutritional composition in powder form capable of being used as an adjunct to a ketogenic diet program. The disclosed ketogenic nutritional composition can produce elevated and sustained levels of ketone bodies in blood and can synergistically induce nutritional ketosis in a subject. The ketogenic nutritional composition disclosed herein can exhibit improved physical stability, solubility, homogeneity and aqueous dispersibility compared to existing ketogenic diet supplements, and is substantially free of carbohydrates. Further the disclosed ketogenic nutritional composition can contribute to reduction in body fat mass in individuals who are trying to lose weight, and can provide long-lasting energy and improved athletic performance to individuals during strenuous exercise.

As used herein, the terms "nutritional composition," "nutritional product," and "nutritional powder", unless otherwise specified, are used interchangeably to refer to a composition that includes fat, protein, vitamin and phospholipid, and is suitable for oral administration to a subject.

As used herein, the terms "powder" and "nutritional powder", unless otherwise specified, each describe a physical form of the disclosed nutritional composition, that is flowable or scoopable and can be reconstituted or dispersed in water or other aqueous liquid prior to consumption.

As used herein, the term "subject" refers preferably to mammals, more preferably humans.

As used herein, the term "substantially free of carbohydrates" may refer to nutritional composition disclosed herein that contains little or no carbohydrate, i.e. zero carbohydrate.

In an aspect, the present disclosure provides a ketogenic nutritional composition in powder form for promoting nutritional ketosis in a subject in need thereof, wherein the composition can include fat, protein, vitamin, and phospholipids.

In an embodiment, the fat used in the nutritional composition of the present disclosure can be selected from the group consisting of coconut oil, fractionated coconut oil, medium chain triglyceride (MCT) oil and a mixture thereof. In another embodiment, fat can be used in the composition of the present disclosure in the range of 40-80% by weight.

In another embodiment, the protein used in the nutritional composition of the present disclosure can be a natural protein which can preferably be selected from the group consisting of casein, whey protein, egg protein, soy protein and a mixture of milk proteins. In a preferred embodiment, the protein can be sodium caseinate. In certain embodiments, protein can be used in the nutritional composition of the present disclosure in the range of 10-40% by weight.

In an embodiment, the vitamin used in the nutritional composition can preferably be vitamin E. Preferred vitamin E can include α-tocopherol. In another embodiment, vitamin can be used in the nutritional composition of the present disclosure in the range of 0.1-0.5% by weight.

In an embodiment, the phospholipid used in the nutritional composition of the present disclosure can be natural phospholipids. In one preferred embodiment, the phospholipid can be soy phospholipids. In a more preferred embodiment, soy phospholipids can contain at least 50% phosphatidylcholine. In certain embodiments, phospholipids can be used in the disclosed nutritional composition in the range of 0.5-2% by weight.

In another aspect, the present disclosure provides a method for producing a ketogenic nutritional powder which is substantially free of carbohydrates, the method can include the steps of: (a) mixing a fat and a protein to form a first mixture; (b) mixing a vitamin and a phospholipid in an organic solvent to form a second mixture; (c) providing a spray drying apparatus comprising a spray nozzle comprising a three-fluid nozzle; (d) supplying the first mixture to the spray nozzle through the first inlet; (e) supplying the second mixture to the spray nozzle through the second inlet; (f) supplying an atomization gas to the spray nozzle thorough the third inlet; (g) spraying the first mixture and the second mixture through the spray nozzle by means of atomization gas to produce a ketogenic nutritional powder.

In one preferred embodiment of the method of the present disclosure, the first mixture can be prepared by blending coconut oil and sodium caseinate, and homogenizing a resulting mixture into a dispersion.

In another preferred embodiment, tocopherol and soy phospholipid may be mixed and dissolved in ethanol solvent to produce the second mixture.

In one embodiment of the method of the present disclosure, the first mixture and the second mixture can be sprayed through the spray pressure nozzle using an atomization nitrogen gas at a pressure to form fine droplets. Water and ethanol can be evaporated from the droplets to result in desired nutritional product in powder form. The method disclosed herein can enable to precisely control spray droplet size and powder particle size by adjustment of process parameters. A key feature can be the atomization system since it controls droplet size and hence particle size. According to embodiments, a higher atomizing gas pressure can provide smaller particles sizes. Spray drying parameters such as air flow rate, inlet temperature, feed flow rate, and the concentration of carrier can influence bulk density, particle size, moisture content, and the yield of final product.

The phospholipids used in the composition of the present disclosure can be heat-resistant and can retain their color at the operating temperature. In an embodiment of the present disclosure, the phospholipids can form a coating on the fat, which prevents or retards oxidative deterioration of the fat, thereby improving the storage stability of spray-dried product. Further, the presence of the phospholipids as a coating on the outer layer of fat can bring about instant aqueous dispersibility of the resultant nutritional powder.

According to embodiments, the disclosed nutritional composition can facilitate weight loss, reduce body fat mass, treat high blood glucose, enhance athletic performance, and act as an adjunct to a ketogenic diet. Further, the disclosed nutritional composition is substantially free of carbohydrates, and can synergistically act in reducing and/or eliminating hunger and promoting nutritional ketosis in subjects. The disclosed nutritional composition can also provide nutritional support for therapeutic fasting, weight loss, and physical performance enhancement.

In another aspect, the present disclosure provides a method for promoting ketosis in a subject, the method can include administering an effective amount of a composition comprising fat, protein, vitamin, and phospholipid to the subject.

In some embodiments, the nutritional composition disclosed herein can be orally administered to a subject with or without dietary restriction. The nutritional composition can be administered on an as-needed or as-desired basis, for example, once-monthly, once-weekly, daily, or more than once daily. In certain embodiments, the disclosed composition can be administered once per day, twice per day, or three times per day to a subject desiring to promote and/or sustain a state of ketosis. In some embodiments, the disclosed nutritional composition may be ingested by a subject on a 2000-calorie diet, at a dose of 50 g/day if he receives 1,650 calories from other sources. On a 1600-calorie diet in a weight-loss program, the subject can consume 50 g/day if he receives 1,250 calories from other sources.

While the foregoing description discloses various embodiments of the disclosure, other and further embodiments of the invention may be devised without departing from the basic scope of the disclosure. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides a nutritional composition which is capable of being used as an adjunct to a ketogenic diet program.

The present disclosure provides a ketogenic nutritional composition which provides an easy and accelerated method for inducing and sustaining nutritional ketosis.

The present disclosure provides a ketogenic nutritional composition in powder form, which is capable of inducing nutritional ketosis.

The present disclosure provides a ketogenic nutritional powder, which is physically stable as compared to existing ketogenic diet supplements.

The present disclosure provides a ketogenic nutritional powder, which exhibits improved solubility as compared to existing ketogenic diet supplements.

The present disclosure provides a ketogenic nutritional powder, which exhibits improved homogeneity.

The present disclosure provides a ketogenic nutritional powder, which exhibits increased aqueous dispersibility.

The present disclosure provides a ketogenic nutritional powder, which is substantially free of carbohydrates.

The present disclosure provides a nutritional powder, which is useful as a nutritional supplement for people on a ketogenic diet and weight-loss programs.

The present disclosure provides a ketogenic composition, which can promote weight loss and significantly minimize or eliminate hunger.

The present disclosure provides a ketogenic nutritional composition which can contribute to reduction in body fat mass in individuals who are trying to lose weight.

The present disclosure provides a ketogenic nutritional composition which provides long-lasting energy and improved athletic performance to humans during strenuous exercise.

The present disclosure provides a simple and highly efficient process for preparing a ketogenic nutritional composition in powder form.

What is claimed is:

1. A ketogenic composition, having zero carbohydrates, for promoting nutritional ketosis in a subject in need thereof, the composition comprising:
   fat selected from the group consisting of coconut oil, fractionated coconut oil, medium chain triglyceride (MCT) oil and mixtures thereof present in a concentration of 80% by weight;
   protein being a natural protein selected from casein, whey protein, egg protein, soy protein and a mixture of milk proteins in the range of 15-18% by weight;
   vitamin being vitamin E in the range of 0.1-0.5% by weight; and
   a natural phospholipid in the range of 0.5-2% by weight, wherein the ketogenic composition is in powder form.

2. The ketogenic composition as claimed in claim 1, wherein the fat comprises coconut oil.

3. The ketogenic composition as claimed in claim 1, wherein the casein comprises sodium caseinate.

4. The ketogenic composition as claimed in claim 1, wherein the vitamin E comprises α-tocopherol.

5. The ketogenic composition as claimed in claim 1, wherein the natural phospholipids comprise soy phospholipids, and wherein the soy phospholipids comprise at least 50% phosphatidylcholine.

6. A method of promoting ketosis in a subject, comprises administering an effective amount of the composition of claim 1 to the subject in need thereof.

7. A method for producing a ketogenic powder composition, as claimed in claim 1, comprising:
mixing a fat and a protein to form a first mixture;
mixing a vitamin and a phospholipid in an organic solvent to form a second mixture;
providing a spray drying apparatus comprising a three-fluid spray nozzle;
supplying the first mixture to the three-fluid spray nozzle through a first inlet;
supplying the second mixture to the three-fluid spray nozzle through a second inlet;
supplying an atomization gas to the three-fluid spray nozzle thorough a third inlet; and
spraying the first mixture and the second mixture through the three-fluid spray nozzle using an atomization gas to produce the ketogenic powder composition.

8. The method as claimed in claim 7, wherein the organic solvent comprises ethanol.

9. The method as claimed in claim 7, wherein the atomization gas comprises nitrogen gas.

10. The method as claimed in claim 7, wherein the protein comprises sodium caseinate.

11. The method as claimed in claim 7, wherein the vitamin E comprises α-tocopherol.

12. The method as claimed in claim 7, wherein the natural phospholipid comprises a soy phospholipid.

13. The method as claimed in claim 12, wherein the soy phospholipid comprises at least 50% phosphatidylcholine.

* * * * *